United States Patent [19]

Karmas et al.

[11] Patent Number: 5,017,387

[45] Date of Patent: May 21, 1991

[54] NOVEL NATURAL YOGHURT COMPOSITIONS AND METHOD OF PREPARATION

[75] Inventors: Endel Karmas, Kendall Park, N.J.; Marc R. Bachmann, Winterthur, Switzerland

[73] Assignee: Rutgers, The State University of New Jersey, New Brunswick, N.J.

[21] Appl. No.: 535,981

[22] Filed: Jun. 8, 1990

Related U.S. Application Data

[63] Continuation of Ser. No. 808,155, Dec. 12, 1985, abandoned.

[51] Int. Cl.$^5$ .......................... A23L 1/20; A23C 9/13
[52] U.S. Cl. ......................................... 426/43; 426/46; 426/61; 426/52; 426/583
[58] Field of Search ..................... 426/34, 42, 43, 44, 426/46, 52, 61, 583, 598, 634

[56] References Cited

U.S. PATENT DOCUMENTS

| | | |
|---|---|---|
| 1,243,855 | 10/1917 | Melhuish ............................ 426/598 |
| 1,359,633 | 11/1920 | Thévenot ........................... 426/598 |
| 3,096,177 | 7/1963 | Ariyama . |
| 3,798,339 | 3/1974 | Peng . |
| 3,950,544 | 4/1976 | Fridman ............................. 426/43 |
| 3,966,992 | 6/1976 | Banks et al. . |
| 3,969,534 | 7/1976 | Pavey et al. . |
| 4,064,283 | 12/1977 | Saunders et al. . |
| 4,066,792 | 1/1978 | Kanda et al. ..................... 426/43 |
| 4,066,794 | 1/1978 | Schur ................................ 426/43 |
| 4,105,803 | 8/1978 | Peng . |
| 4,107,334 | 8/1978 | Jolly . |
| 4,110,476 | 8/1978 | Rhodes . |
| 4,163,802 | 8/1979 | Redfern et al. . |
| 4,225,629 | 9/1980 | Saunders et al. . |
| 4,289,788 | 9/1981 | Cajigas . |
| 4,320,150 | 3/1982 | Austin et al. . |
| 4,325,977 | 4/1982 | Remer . |
| 4,328,115 | 5/1982 | Metz . |
| 4,374,155 | 2/1983 | Igoe et al. . |
| 4,391,830 | 7/1983 | Gudnason et al. . |
| 4,416,905 | 11/1983 | Lundstedt et al. ................. 426/34 |
| 4,430,349 | 2/1984 | Malone et al. . |
| 4,432,999 | 2/1984 | Bily . |
| 4,435,432 | 3/1984 | Klupsch . |
| 4,446,164 | 5/1984 | Brog . |
| 4,486,413 | 12/1984 | Wiesenberger et al. . |

FOREIGN PATENT DOCUMENTS

1154139 6/1969 United Kingdom .

OTHER PUBLICATIONS

Shi. J. of Japan Food Industry Assoc., vol. 17, No. 10, pp. 456–461 (1970).
Yamanaka, Studies on Utilization of Soybean Protein for Food Manufact., J. of Food Sci. & Tech., vol. 17, No. 11, 1970, pp. 26–31.
Schroder et al., Prep. of Soybean Cheese Using Lactice Starter Organisms, J. of Food Science, vol. 36, No. 24, 1971, pp. 22–24.

*Primary Examiner*—Marianne Cintins
*Attorney, Agent, or Firm*—Leroy G. Sinn

[57] ABSTRACT

Novel firm, natural yoghurt compositions made by fermentation of a fermentation mixturte comprising about 15 percent to about 70 percent fresh cowmilk or ewemilk and about 85 percent to about 30 percent soymilk using yoghurt culture organisms are provided. Use of a sweetener and a thickener is unnecessary to provide a natural yoghurt composition having a taste and consistency like or substantially indistinguishable from that of a corresponding yoghurt composition made from the fresh milk used in making the novel yoghurt compositions. Flavoring agents and fruit preparations suitable as additives in preparation of yoghurt composition can be added in conventional manner. The provided compositions have an enhanced protein content with a PER value of at least 2.6 and a reduced animal fat content as compared to the corresponding compositions using 100 percent fresh milk. Also provided are methods of preparation of the novel firm, natural yoghurt compositions.

17 Claims, No Drawings

NOVEL NATURAL YOGHURT COMPOSITIONS AND METHOD OF PREPARATION

This is a continuation of co-pending application Ser. No. 06/808,155, filed on Dec. 12, 1985.

1. Technical Field

This invention relates to a novel yoghurt composition made by fermentation using yoghurt fermentation organisms in a fermentation medium comprising a combination of soymilk and fresh cowmilk, ewemilk or other suitable milk. It also relates to a method of preparation of a yoghurt composition using soymilk and cowmilk, ewemilk or other suitable milk.

2. Background Art

Yoghurt is a cultured milk product normally using fresh whole milk, partially skimmed milk or skim milk. The milk is cultured using a suitable culturing organism for making yoghurt which produces lactic acid during the fermentation. The milk ingredient is initially pasteurized, preferably using a high temperature to rid the milk of pathogenic and other unwanted organisms. Pasteurized milk is then cooled to 40° C. to 50° C. and is inoculated using one or more yoghurtproducing organisms. The fermentation is carried out until sufficient acid is produced and a desired low pH is obtained, at which point the milk coagulates to provide the desired yoghurt consistency. The bacterial growth and metabolism are essentially arrested by cooling the yoghurt composition, such as to 0° C. to 5° C. This cooling also essentially causes lactic acid production to be stopped. Fruit and flavoring agents are often added to the yoghurt compositions to suit particular tastes.

Yoghurts may be of the "firm" type or they may be frozen and may be eaten with a spoon. Yoghurts also may be made in liquid form and consumed directly as a liquid or consumed through a straw.

Presently, a major portion of the yoghurt consumed in the United States is of the "firm" type, whereby the yoghurt is processed, packaged, and marketed so as to present a product having pudding-like consistency. Firm yoghurts sometimes exhibit, after a few days standing, a syneresis, or bleeding of whey from the body of the yoghurt, typically resulting in the presence of a small amount of clear liquid on top of and around the yoghurt. This bleeding can be minimized or entirely avoided by increasing the amount of milk solids in a yoghurt, or by adding suitable stabilizers, which increase the firmness of the yoghurt.

Yoghurt is considered to be a healthful form of dairy product. Yoghurt contains an active culture and when it is consumed, some of the organisms from the yoghurt pass unharmed through the stomach. These organisms thrive in an acid medium and are not completely destroyed by the gastric juices. When the yoghurt organisms pass into the intestinal area, they may cause a favorable floral implantation. Yoghurt is believed to have beneficial nutritional value inasmuch as it has desirable vitamin content and other nutrient values. Often the ingestion of yoghurt is beneficial to patients who are required to take large oral doses of antibiotics or other compounds which interfere with the floral activity and contents of the intestine. For those people who have malabsorption of lactose or an intolerance for lactose, yoghurt has an advantage over the starting milk used in its manufacture in that it has lower lactose content. Also, the beta-galactosidase provided by the yoghurt culture bacteria replaces to an extent the lacking or insufficient amount of beta-galactosidase in such people.

In many parts of the world there is a shortage of fresh milk, whether the shortage be local in character or whether it be widespread throughout a large region, such as in one or more countries. Also, a shortage of fresh milk can be seasonal. For example, during a part of the year in some areas of the world, there is adequate rainfall to provide animals with sufficient food so they produce milk in reasonable quantities. However, at other times of the year, shortage of rain can cause the quantity of vegetation for milk-producing animals to be reduced greatly so that the quantity of milk produced by the animals is greatly reduced. Therefore, it is important to be able to extend the quantity of milk so that the nutritious value of fresh milk can be extended and thereby provide some of the valuable nutrients to the human diet.

It has been known that a very good source of protein is the soybean. The soybean is available in a great many parts of the world. The soy protein is both relatively low in cost and has very good nutritional character. However, the soybean food forms such as soymilk can produce so-called "beany flavor", which is undesirable to the taste of man. Also, soybean foods can produce in the form of soymilk or other forms a high degree of flatulence. It is therefore important that there be a method of extending the milk supply and to provide an acceptable form of protein from soybeans, which would provide a greatly needed source of milk as well as protein from soybeans.

Soymilk has been used in the past alone or in combination with other ingredients such as dried whey to make yoghurt compositions which had certain deficiencies.

It would be highly advantageous to provide a yoghurt which permits use of a small content of fresh milk and a high content of soymilk, which yoghurt would have a highly acceptable taste and consistency without requirement to use sweeteners, thickening agents and certain other additives, greatly extend limited supplies of fresh milk, and provide a highly acceptable form of protein (soy protein) and relatively low animal fat and lactose contents as desired.

SUMMARY OF INVENTION

By this invention is provided novel natural yoghurt compositions. They are made by culturing a combination of a high content of soymilk together with an amount of fresh cowmilk, ewemilk or other suitable fresh milk. It has been found, for example, that if the content of the fermentation mixture is at least about 15 percent of fresh cowmilk, ewemilk or other suitable fresh milk, the flavor is very satisfactory and is like or substantially indistinguishable from that of a corresponding yoghurt using 100 percent of the same fresh milk. The soymilk content of the combination of fresh milk and soymilk can vary from about 85 percent to about 30 percent.

It has also been found, surprisingly, that the consistency of the final yoghurt composition is like or substantially indistinguishable from the corresponding yoghurt made from 100 percent fresh milk. It has also been found that the taste of the novel yoghurt compositions is like or substantially indistinguishable from the corresponding yoghurt made with fresh milk. The yoghurt can be made using fresh cowmilk or ewemilk in the form of whole milk, partially skimmed milk, or skim milk. It often is desirable to have the fat content of the yoghurt reduced in order to result in less animal fat intake on the part of the consumer. By using such method of producing yoghurt, it is possible to provide a highly nutritious yoghurt having a high protein content, but at the same time having a low animal fat content. The protein contributed by the soymilk has a composition very similar to that of milk protein.

Another advantage of the yoghurt compositions provided hereby, as compared to a corresponding yoghurt composition made from fresh milk, is their lower lactose contents for those consumers who have malabsorption of lactose or an intolerance for lactose. Additionally the yoghurt culture bacteria of the yoghurt compositions at the same time provide beta-galactosidase to the intestinal area, which is lacking or in insufficient supply in lactose malabsorbing or lactose intolerant people.

The yoghurt compositions of this invention provide important nutrients for the well-being of consumers.

The invention also relates to a method of preparation of such low animal fat, high protein content yoghurt compositions whereby soymilk is utilized to benefit from its unique protein character, which can be provided at low cost and which is available in large and widely prevalent supply. This method permits extension of the supply of fresh milk. The process enables important contribution to the nutrition of peoples in various parts of the world.

DETAILED DESCRIPTION OF THE INVENTION

In making the yoghurt compositions of this invention, it is preferred to use fresh cowmilk or ewemilk. However, other suitable fresh milk can be employed. For example, goat milk, buffalo milk, and others can be used. It is suitable to utilize from 15 to 70 percent of fresh cowmilk in the preferred compositions. Correspondingly, about 30 to about 85 percent soymilk is used. Preferably, in view of economic considerations and the best extension of the available supply of fresh milk, the use of the greater percentages of soymilk is preferred. It has been found that the use of about 15 percent of fresh cowmilk or other suitable fresh milk is preferred in view of economic considerations. It has been found that the use of such 15 percent fresh milk provides, surprisingly, a yoghurt composition in which the flavor and the consistency are like or substantially indistinguishable from a corresponding yoghurt composition made using 100 percent fresh cowmilk, ewemilk or other suitable fresh milk. Another preferred composition is made from a fermentation mixture of pasteurized fresh cowmilk, ewemilk or other suitable fresh milk, the quantity of fresh milk used is from about 15 percent up to less than 50 percent, with a more preferred quantity of fresh milk being from about 15 percent to about 25 percent, with the remainder of the composition comprising soymilk.

The yoghurt compositions provided by this invention and the methods of preparation of this invention have a firm consistency, especially when there is absence in the composition of a substantial amount of additives, such as fruit and flavoring agents, etc. Therefore, when unflavored or natural yoghurt is made, it is not necessary to use thickening agents or gelling agents. Also, it is not necessary when making such natural yoghurt compositions to add sweetening agents. The yoghurt compositions of this invention do not require added sweetening agents in the same manner that corresponding yoghurt compositions made using 100 percent pasteurized fresh cowmilk or other fresh milk do not require added sweetening agents.

Suitable soymilk can be provided for use in making the yoghurt compositions by soaking good quality whole soybeans in water for an appropriate time. A period of 12-18 hours is adequate. Soaking is suitably carried out at room temperature, for example, at a temperature of 20° C. to 25° C. The water:soybean ratio can vary. However, a ratio of about 3 parts by weight of water to one part by weight of soybeans is suitable. The ratio can be increased or decreased somewhat with satisfactory results. The soaking water then is removed and is discarded. The soaked beans are washed. The water used can be a good quality tap water. If desired, distilled water can be used, but ordinarily it is not necessary to use distilled water for the washing step. The water used for washing the soybeans is discarded. The washed soybeans are then desirably blanched such as for 10-25 minutes, suitably for about 15 minutes at an elevated temperature such as 90° C. to 95° C. The water:soybean ratio used for blanching can vary, but a ratio of from 7:1 to 8:1 is suitable. Upon completion of the blanching step the water:soybean mixture is milled using a suitable instrument such as a Waring blender to form an aqueous soybean purée. The solid portion of the purée is removed suitably by centrifugation. Following the above procedure as designated a suitable soymilk is obtained having a soy protein content of 3.1 to 3.6 percent.

The yoghurt compositions of this invention are made by making the desired fermentation mixture by blending the desired amount of soymilk with the desired percentage of fresh cowmilk, ewemilk or other suitable fresh milk. The ingredients of the fermentation mixture are then pasteurized at high temperature, typically in the range of 80° C. to about 110° C., preferably at about 85° C. to 95° C., at which heat the pasteurization process is at times carried out under high pressure. Pasteurization is carried out so long as necessary to kill the undesired organisms. Care should be exercised not to heat the mixture longer than necessary. Deleterious effects can result. It has been found that maintaining the mixture at 90° C. for a minute or less, such as about 15 seconds, is generally adequate. In some cases, somewhat longer time might be necessary.

The pasteurized mixture then is cooled in one or more stages to a temperature in the range of about 40° C. to about 50° C., preferably at about 40 to about 45° C., a temperature of about 42° C. being highly suitable; and then it is inoculated with a yoghurt producing culture. Known yoghurt cultures are satisfactory for use in this method. The fermentation or culturing is continued for an appropriate time until the yoghurt composition reaches a pH in the range of about 3.8 to about 5.0, preferably about 4.0 to about 4.6, a pH of about 4.3 being preferred. At this time the consistency of the yoghurt composition is denominated "firm" as is understood in the yoghurt art. Appropriate time for the fermentation is generally about 5 to about 10 hours. Longer times can be used but generally are unnecessary and on occasion certain longer times can result in undesirable properties. About 5 to about 6 hours of fermentation is usually sufficient fermentation time and therefore would, if sufficient, be a preferred fermentation time.

The organism used in the fermentation or culturing process can be one of several yoghurt producing cultures. For example, the yoghurt culture, also called a characterizing bacterial culture, can be *Lactobacillus bulgaricus*, a lactic acid-forming, rod-shaped bacterium, a *Streptococcus thermophilus*, a coccus bacteria able to grow and produce lactic acid at high temperatures, or other suitable yoghurt producing organisms. It has been found preferred to use a combination of *Lactobacillus bulgaricus* and *Streptococcus thermophilus*. These organisms can be used in a combination of effective portions such as generally equal amounts or can be adjusted in quantity as desired in the particular preference of the one making the yoghurt compositions of this invention. These yoghurt cultures can be obtained from commercial sources in a dried, stable form, which are suitable for addition to the pasteurized yoghurt fermentation combination without contaminating the fermentation mixture or otherwise detracting from the desired quality of the final yoghurt composition. Also, *Lactobacillus acidophilus*, or other yoghurt organisms, can be added to the *L. bulgaricus - S. thermophilus* combination above or in other combinations.

The equipment used in carrying out the method of preparation of the yoghurt compositions of this invention can be that conventionally used by those skilled in the yoghurt art, either commercially or utilized by consumers themselves. The equipment utilized will permit the culturing or fermentation process to be carried out without comtamination and with suitable control of fermentation temperatures. Often the fermentation is carried out in the final package used in storing, transporting and merchandising the final yoghurt composition.

A stabilizing agent may be added as desired in a suitable quantity. The stabilizing agent can offset any separation during storage of whey from the yoghurt composition, which action is called in the art syneresis. The amount of stabilizing agent should be kept to a minimum effective amount. Stabilizer agents acceptable to the yoghurt art can be used. A suitable agent for such stabilization or dispersion is non-fat dry milk solids. Such dry milk solids can be added in a quantity as desired from about 0.1 to about 10 percent, desirably from about 0.3 to about 7 percent, and preferably from about 1 to about 5 percent by weight based on the total yoghurt composition weight. The non-fat dry milk solids which can be used is available commercially in powdered form and is preferably of the type that is readily dissolved in water. For this purpose, there may be employed dried skim milk solids which has been dehydrated to form a concentrated liquid, then subjected to a second spray drying step so as to aerate the milk powder, thereby rendering it quickly soluble.

Flavoring agents may be incorporated into yoghurt compositions as desired. They can be added to the pasteurized fermentation mixture. The flavoring agent may be natural or artificial, and it is preferable to use one which imparts to the yoghurt composition a fruit flavor, such as strawberry, blueberry, peach, cherry, lemon, mango, banana, kiwi, coconut and the like. Other flavors such as tomato, peanut butter, chocolate, and the like can also be used. It might also be desirable to add such flavors as vanilla and other flavors which are customarily used in the yoghurt art.

When a flavoring agent is employed, it may be required or desirable to use a sweetening agent to offset the taste of the added component. Conventional sweetening agents can be used for the purpose, such as sucrose, fructose, and synthetic agents, such as saccharin, aspartame and others. At times the preferred sweetening agent is fructose, or combinations of fructose and sucrose or other agents.

The amount of flavoring agent used may vary widely according to taste, but generally an amount from about 0.1 to about 5, typically from about 0.3 to about 3.0, and preferably from about 0.5 to about 1.0 percent by weight based upon the total composition on a dry weight basis, is used.

Coloring agents may also be used in the preparation of the yoghurt compositions of this invention. A coloring agent may be any acceptable coloring ingredient appropriate to the flavoring agent. Thus, in the case of strawberry flavor, an appropriate accepted or approved red coloring agent can be used. The amount of coloring agent may vary widely, but an amount generally from about 0.001 to about 1.0, typically from about 0.02 to about 0.5, and preferably from about 0.06 to about 0.1 percent by weight of the total yoghurt composition may be used based on dry weight of the yoghurt composition.

If it is desired to add fruit in the conventional manner, it can be added either as a dispersion in the fermentation of pasteurized combination or it can be conventionally added at the bottom of the container in the desired quantity before adding the yoghurt fermentation composition.

The desired fruit is added aseptically in the form of a pasteurized fruit preparation. The fruit can be added to the bottom of the yoghurt container in which the yoghurt is sold, such as an 8 ounce container. The amount of the preparation added can vary, such as from 5 to 10 percent by weight of the yoghurt weight. The yoghurt container, with the fruit preparation at the bottom, can after capping be inverted to cause the fruit preparation to come to the top of the yoghurt surface. The fruit preparation can also be mixed into the yoghurt during preparation if stirred or Swiss-style yoghurt is desired.

It is at times desired to add to the yoghurt compositions an amount of thickening agent to offset the influence of such added fruits or flavoring agents. Conventional thickening agents can be used in the normally required amounts to retain the desired firm consistency of the final yoghurt compositions. A thickening agent is preferably water soluble and one that is approved for use in such food preparations as yoghurt. The thickening agent employed should also not detract from the flavor of the yoghurt composition. An amount of such thickening agent is added which will provide the desired thickening. Generally, the amount of the thickening agent used does not exceed about 0.5 to about 1 percent, depending upon the yoghurt composition, the additives to the yoghurt composition, and the particular thickening or stabilizing agent employed. Such stabilizing or thickening agents include plant exudates (e.g., gum arabic), seaweed extracts (e.g., alginates), plant and seed gums (e.g., guar gum) and plant extracts (e.g., pectin). These commercial stabilizers are soluble in water or milk and therefore may be incorporated at the beginning of the fermentation process or at later stages as desired. Also, certain pectin derivatives can be used such as methoxy pectins. The quantity of stabilizers should not detract from the firm consistency of the yoghurt composition and should not detract from the texture of the yoghurt as it appears to the eye or to the touch of the mouth, referred to as "mouth appeal."

The yoghurt compositions of this invention provide Protein Efficiency Ratio (PER) value of at least about 2.6. The PER value of soy ilk protein alone is less than 2.4. Therefore, the yoghurt compositions of this invention, having a PER of at least 2.6, is complete as compared with referenced PER-value of casein, which is 2.5. An important consideration of the yoghurt compositions of this invention is that with the use of a small amount of fresh cowmilk, ewemilk or other suitable fresh milk, a yoghurt composition is provided which has a high PER value.

The pH of the fermentation or culture mixture during the course of the preparation can be determined in conventional manner using a suitable pH instrument.

The amount of lactic acid produced which contributes largely to the increase in acidity as desired is measured following a conventional titration method using, for example, a known Soxhlet-Henkel method. The designation ° SH is used to refer to the lactic acid present in the yoghurt composition which is equivalent to the milliliters of 0.25N NaOH used to titrate 100 milliliters of yoghurt composition, using phenolphthalein as the indicator and following a conventional titration procedure.

The following examples are for the purpose of illustration and are not intended to be limiting.

EXAMPLE I

Whole soybeans are soaked in water overnight (about 16 hours) at room temperature (20-25° C.) using tap water:soybean weight ratio of 3:1. The water is discarded. The soybeans are rinsed with tap water. The soaked soybeans are blanched at 90-95° C. for 15 minutes using water: soybean weight ratio of about 7.5:1. The aqueous soybean mixture is then formed into a purée using a Waring blender. The resulting purée is centrifuged to separate the soymilk from the solid matter. The solid material is discarded. The soymilk has 3.1-3.6 percent by weight soy protein content.

The soymilk is added to 15-75 parts by volume of cowmilk to make 100 parts of the mixture. The mixture is then pasteurized at about 90° C. for 15 seconds and then cooled.

The cooled, pasteurized mixtures are then inoculated with 3-5 percent by volume of a yoghurt culture having 1:1 ratio of *Lactobacillus bulgaricus* and *Streptococcus thermophilus*. The incubation is carried out at about 42° C. In about 2 hours thickening will occur. The fermentation is carried out for about 5.5 hours. The pH and ° SH values are obtained using the mixtures listed in the following table:

TABLE

| Comp. No. | Composition (% by vol.) | | Analysis after 5.5 hrs. Fermentation | |
|---|---|---|---|---|
| | Soymilk | Cowmilk | pH | SH |
| 1 | 100 | 0 | 4.54 | 18.5 |
| 2 | 90 | 10 | 4.33 | 25.0 |
| 3 | 80 | 20 | 4.15 | 32.0 |
| 4 | 75 | 25 | 4.07 | 34.0 |
| 5 | 70 | 30 | 4.02 | 36.0 |
| 6 | 0 | 100 | 3.91 | 46.0 |

The yoghurt compositions 3-5 coming within this invention have firm consistency and have a flavor like or substantially indistinguishable from that of a corresponding yoghurt composition using 100 percent of fresh cowmilk.

A small amount of citric acid can be added to the fermentation mixture to enhance the flavor of the final yoghurt composition. A suitable amount of citric acid is 0.5 percent based on the weight of the composition.

EXAMPLE 2

The procedure of Example 1 is repeated using lowfat (1.5 percent butterfat) cowmilk instead of whole cowmilk.

EXAMPLE 3

The procedure of Example 1 is repeated using skim milk instead of whole cowmilk.

EXAMPLE 4

The procedure of Example 1 is repeated using ewemilk instead of cowmilk.

EXAMPLE 5

The procedures of Examples 1-4 are repeated using the following fruit or flavoring agents: mango, banana, kiwi, coconut, tomato, peanut butter, chocolate or vanilla flavoring agents; and strawberry, blueberry, raspberry, peach or cherry yoghurt fruit preparations.

What is claimed is:

1. A natural yoghurt composition comprising a fermented, pasteurized mixture of about 30 to about 85 percent soymilk made by milling a mixture of water and soybeans and removing the solid portion of said milled mixture to provide said soymilk, about 15 to about 70 percent fresh cow or ewe milk, to which said soymilk is added to make said mixture, and a yoghurt producing culture comprising a combination of *Lactobacillus bulgaricus* and *Streptococcus thermophilus*, said yoghurt having a firm consistency without the use of a thickening agent and having without addition of sugar a flavor like or substantially indistinguishable from a yoghurt made by fermentation using 100 percent pasteurized fresh milk.

2. A natural yoghurt composition according to claim 1 wherein the mixture has about 50 to about 85 percent soymilk and about 15 up to less than 50 percent fresh milk.

3. A natural yoghurt composition according to claim 1 wherein the mixture has about 75 to about 85 percent soymilk and about 15 to about 25 percent fresh milk.

4. A natural yoghurt composition according to claim 1 wherein the fresh milk used is fresh cowmilk.

5. A natural yoghurt composition according to claim 2 wherein the fresh milk used is fresh cowmilk.

6. A natural yoghurt composition according to claim 3 wherein the fresh milk used is fresh cowmilk.

7. A yoghurt composition according to claim 1 which further comprises a fruit or flavoring agent.

8. A yoghurt composition according to claim 2 which further comprises a fruit or flavoring agent.

9. A yoghurt composition according to claim 3 which further comprises a fruit or flavoring agent.

10. A yoghurt composition according to claim 4 which further comprises a fruit or flavoring agent.

11. A yoghurt composition according to claim 5 which further comprises a fruit or flavoring agent.

12. A yoghurt composition according to claim 6 which further comprises a fruit or flavoring agent.

13. A method for preparation of a firm yoghurt composition comprising inoculating a pasteurized fermentation mixture of about 30 to about 85 percent soymilk made by milling a mixture of water and soybeans and removing the solid portion of said milled mixture to provide said soymilk and about 15 about 70 percent fresh cow or ewe milk, to which said soymilk is added to make said mixture, with a yoghurt-producing culture comprising a combination of *Lactobacillus bulgaricus* and *Streptococcus thermophilus* organisms to obtain a fermentation mixture, and maintaining a fermentation temperature in the range of about 40° C. to about 50° C. until a pH of from 3.8 to 5.0 is obtained to provide a firm yoghurt composition having without addition of sugar a flavor like or substantially indistinguishable from a yoghurt made using 100 percent pasteurized fresh milk.

14. A process of claim 13 wherein the fresh milk used is cowmilk and the inoculating culture comprises about equal parts of *Lactobacillus bulgaricus* and *Streptococcus thermophilus*.

15. A process of claim 13 wherein the pH of the yoghurt composition is about 4.0 to about 4.6 and the inoculating culture comprises about equal parts of *Lactobacillus bulgaricus* and *Streptococcus thermophilus*.

16. A process of claim 13 wherein the pH of the yoghurt composition is about 4.3.

17. A process of claim 13 wherein the inoculating culture comprises about equal parts of *Lactobacillus bulgaricus* and *Streptococcus thermophilus*, the amount of fresh milk is about 15 to about 25 percent, and the pH of the yoghurt composition is about 4.3.

* * * * *